(12) United States Patent
Jang et al.

(10) Patent No.: US 12,167,398 B2
(45) Date of Patent: *Dec. 10, 2024

(54) METHOD AND APPARATUS FOR DATA TRANSMISSION OF TERMINAL IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,924

(22) Filed: Sep. 11, 2023

(65) Prior Publication Data

US 2023/0422248 A1 Dec. 28, 2023

Related U.S. Application Data

(63) Continuation of application No. 18/068,393, filed on Dec. 19, 2022, now Pat. No. 11,758,537, which is a
(Continued)

(30) Foreign Application Priority Data

Nov. 4, 2016 (KR) .................. 10-2016-0146654

(51) Int. Cl.
*H04W 72/20* (2023.01)
*H04L 1/08* (2006.01)
(Continued)

(52) U.S. Cl.
CPC .............. *H04W 72/20* (2023.01); *H04L 1/08* (2013.01); *H04L 5/0053* (2013.01); *H04W 8/24* (2013.01); *H04W 76/14* (2018.02)

(58) Field of Classification Search
CPC ....... H04W 72/20; H04W 76/14; H04W 8/24; H04L 1/08; H04L 5/0053
See application file for complete search history.

(56) References Cited

U.S. PATENT DOCUMENTS 8,503,436 B2 * 8/2013 Yi ..................... H04L 1/1841
370/352
8,605,674 B2 12/2013 Park et al.
(Continued)

FOREIGN PATENT DOCUMENTS

CN 103201977 A 7/2013
CN 104272796 A 1/2015
(Continued)

OTHER PUBLICATIONS

International Search Report regarding International Application No. PCT/KR2017/012482, issued Mar. 5, 2018, 3 pages.
(Continued)

*Primary Examiner* — Ajay Cattungal

(57) ABSTRACT

The present disclosure relates to a communication system and technique that may be applied to intelligent services based on a 5G communication technology and an IoT-related technology. The present disclosure provides a method for data transmission of a terminal in a wireless communication system that includes inputting a packet data convergence protocol packet data unit (PDCP PDU) output from a PDCP entity to a first radio link control (RLC) entity and a second RLC entity. The method also includes inputting a first radio link control packet data unit (RLC PDU) output from the first RLC entity and a second RLC PDU output from the second RLC entity to a medium access control (MAC) entity and transmitting a medium access control packet data unit (MAC PDU) output from the MAC entity through a first physical layer (PHY) entity and a second physical layer entity.

18 Claims, 16 Drawing Sheets

Related U.S. Application Data continuation of application No. 17/099,520, filed on Nov. 16, 2020, now Pat. No. 11,533,712, which is a continuation of application No. 16/659,187, filed on Oct. 21, 2019, now abandoned, which is a continuation of application No. 15/804,942, filed on Nov. 6, 2017, now Pat. No. 10,455,551.

(51) Int. Cl.
*H04L 5/00* (2006.01)
*H04W 8/24* (2009.01)
*H04W 76/14* (2018.01)

(56) References Cited

U.S. PATENT DOCUMENTS

| | | | |
|---|---|---|---|
| 9,585,149 B1* | 2/2017 | Park | H04L 5/0058 |
| 10,764,870 B2 | 9/2020 | Yi et al. | |
| 2012/0057560 A1* | 3/2012 | Park | H04L 1/1887 |
| | | | 370/328 |
| 2012/0281564 A1 | 11/2012 | Zhang et al. | |
| 2012/0281600 A1* | 11/2012 | Tseng | H04L 5/0007 |
| | | | 370/280 |
| 2013/0242859 A1* | 9/2013 | Celik | H04L 47/32 |
| | | | 370/328 |
| 2013/0336201 A1* | 12/2013 | Nishio | H04L 1/1854 |
| | | | 370/315 |
| 2014/0293896 A1* | 10/2014 | Kuo | H04L 5/0053 |
| | | | 370/329 |
| 2014/0293903 A1* | 10/2014 | Kuo | H04W 76/34 |
| | | | 370/328 |
| 2014/0362767 A1 | 12/2014 | Xu | |
| 2015/0215987 A1* | 7/2015 | Kim | H04W 76/20 |
| | | | 370/329 |
| 2015/0249531 A1* | 9/2015 | Lindoff | H04L 5/14 |
| | | | 370/280 |
| 2015/0305000 A1* | 10/2015 | Nguyen | H04L 1/1822 |
| | | | 370/329 |
| 2016/0374082 A1* | 12/2016 | Nguyen | H04W 72/12 |
| 2017/0264562 A1* | 9/2017 | Yi | H04L 47/34 |
| 2017/0289845 A1* | 10/2017 | Chiu | H04W 28/065 |
| 2018/0098250 A1* | 4/2018 | Vrzic | H04W 36/0016 |
| 2018/0098376 A1 | 4/2018 | Jang et al. | |

FOREIGN PATENT DOCUMENTS

| | | |
|---|---|---|
| CN | 104685959 A | 6/2015 |
| KR | 20100122054 A | 11/2010 |
| KR | 101606205 B1 | 3/2016 |
| KR | 20160074477 A | 6/2016 |
| WO | 2010131850 A2 | 11/2010 |
| WO | 2012064772 A1 | 5/2012 |
| WO | 2016159731 A1 | 10/2016 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.0.1, Sep. 2016, 39 pages.
"3rd Generation Partnership Project; Technical Specification Group Radio Access Network; Evolved Universal Terrestrial Radio Access (E-UTRA); Radio Link Control (RLC) protocol specification (Release 13)", 3GPP TS 36.322 V13.2.0, Jun. 2016, 45 pages.
Ericsson, "UP aspects for URLLC traffics", 3GPP TSG-RAN WG2 #95bis, Tdoc R2-166821, Oct. 2016, 3 pages.
Supplementary European Search Report in connection with European Application No. 17867867.8 dated May 14, 2020, 8 pages.
China National Intellectual Property Administration (CNIPA), "The First Office Action," dated May 7, 2022, in connection with counterpart Chinese Patent Application No. 201780068160.1, 23 pages.
Office Action issued Jul. 11, 2024, in connection with Korean Patent Application No. 10-2016-0146654, 10 pages.

* cited by examiner

METHOD AND APPARATUS FOR DATA TRANSMISSION OF TERMINAL IN WIRELESS COMMUNICATION SYSTEM

CROSS-REFERENCE TO RELATED APPLICATIONS

This application is a continuation of application Ser. No. 18/068,393 filed on Dec. 19, 2022, now U.S. Pat. No. 11,758,537 issued Sep. 12, 2023, which is a continuation of application Ser. No. 17/099,520, filed Nov. 16, 2020, now U.S. Pat. No. 11,533,712, issued Dec. 20, 2022, which is a continuation of application Ser. No. 16/659,187, filed Oct. 21, 2019, now abandoned, which is a continuation of application Ser. No. 15/804,942, filed Nov. 6, 2017, now U.S. Pat. No. 10,455,551, issued Oct. 22, 2019, which is related to and claims priority to Korean Patent Application No. 10-2016-0146654, filed Nov. 4, 2016, the disclosures of which are herein incorporated by reference in their entirety.

BACKGROUND

1. Field

The present disclosure relates to a method for transmission and reception of data for ultra-reliable and low-latency communications (URLLC) in a wireless communication system.

2. Description of the Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

In accordance with recent development of long term evolution (LTE) and LTE-advanced (LTE-A), there is a need for a method and apparatus for transmission and reception of data for ultra-reliable and low-latency communications (URLLC) in a wireless communication system.

SUMMARY

To address the above-discussed deficiencies, it is a primary object to provide a method for transmission and reception of data for ultra-reliable and low-latency communications (URLLC) in a wireless communication system.

Another aspect of the present disclosure provides a method of using a corresponding resource if a terminal receives uplink resource allocation during random access in a cell in which only a sounding reference signal (SRS) may be transmitted in uplink.

In accordance with an aspect of the present disclosure, a method for data transmission of a terminal in a wireless communication system, the method includes: inputting a packet data convergence protocol packet data unit (PDCP PDU) output from a packet data convergence protocol entity to a first radio link control (RLC) entity and a second radio link control entity, inputting a first radio link control packet data unit (RLC PDU) output from the first radio link control entity and a second radio link control packet data unit output from the second radio link control entity to a medium access control (MAC) entity, and transmitting a medium access control packet data unit (MAC PDU) output from the medium access control entity through a first physical layer entity and a second physical layer entity.

The method may further include: receiving configuration information for duplicate input of the packet data convergence protocol packet data unit from a base station, in which the medium access control packet data unit is transmitted through the first physical layer entity and the second physical layer entity determined based on the configuration information.

Packet data convergence protocol packet data units input to the first radio link control entity and the second radio link control entity, respectively, may have the same sequence number.

The first radio link control packet data unit and the second radio link control packet data unit may have different sequence numbers.

The first radio link control entity and the second radio link control entity may be entities operated in an unacknowledged mode (UM) in which retransmission through automatic repeat request (ARQ) is not performed.

The first physical layer entity and the second physical layer entity may have different frequencies for transmitting the medium access control packet data unit or different antennas for transmitting the medium access control packet data unit in the same frequency.

In accordance with another aspect of the present disclosure, a method for data reception of a base station in a wireless communication system, the method includes: transmitting configuration information for duplicate generation of packet data convergence protocol packet data units to a terminal; and receiving the duplicately generated packet data convergence protocol packet data units based on the configuration information through a physical layer entity of the terminal corresponding to each packet data convergence protocol packet data unit.

The duplicately generated packet data convergence protocol packet data units may have the same sequence number.

In accordance with another aspect of the present disclosure, a terminal in a wireless communication system includes: a transceiver configured to transmit and receive a signal; and a controller configured to control the transceiver to input a packet data convergence protocol packet data unit output from a packet data convergence protocol entity to a first radio link control entity and a second radio link control entity, input a first radio link control packet data unit output from the first radio link control entity and a second radio link control packet data unit output from the second radio link control entity to a medium access control entity, and transmit a medium access control packet data unit output from the medium access control entity through a first physical layer entity and a second physical layer entity.

The controller may control the transceiver to receive configuration information for duplicate input of the packet data convergence protocol packet data unit from a base station, and transmit the medium access control packet data unit through the first physical layer entity and the second physical layer entity based on the configuration information.

Packet data convergence protocol packet data units input to the first radio link control entity and the second radio link control entity, respectively, may have the same sequence number.

The first radio link control packet data unit and the second radio link control packet data unit may have different sequence numbers.

The first radio link control entity and the second radio link control entity may be entities operated in an unacknowledged mode (UM) in which retransmission through automatic repeat request (ARQ) is not performed.

The first physical layer entity and the second physical layer entity may have different frequencies for transmitting the medium access control packet data unit or different antennas for transmitting the medium access control packet data unit in the same frequency.

In accordance with another aspect of the present disclosure, a base station in a wireless communication system includes: a transceiver configured to transmit and receive a signal; and a controller configured to control the transceiver to transmit configuration information for duplicate generation of packet data convergence protocol packet data units to a terminal, and receive the duplicately generated packet data convergence protocol packet data units based on the configuration information through a physical layer entity of the terminal corresponding to each packet data convergence protocol packet data unit.

In accordance with another aspect of the present disclosure, a method for uplink reference signal transmission of a terminal includes receiving a first message for activating a cell in which only a sounding reference signal (SRS) may be transmitted in uplink, transmitting a preamble to the activated cell, receiving a second message including uplink transmission resource information based on the preamble from the base station, and determining whether to transmit the SRS based on the uplink transmission resource information.

According to an embodiment of the present disclosure, it is possible to increase a reception success rate and, at the same time, decrease latency when transmitting data.

According to another embodiment of the present disclosure, if a terminal receives uplink resource allocation during random access in a cell in which only an SRS may be transmitted in uplink, it is possible to prevent unnecessary power consumption of the terminal or use the corresponding resources by using the method proposed in the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
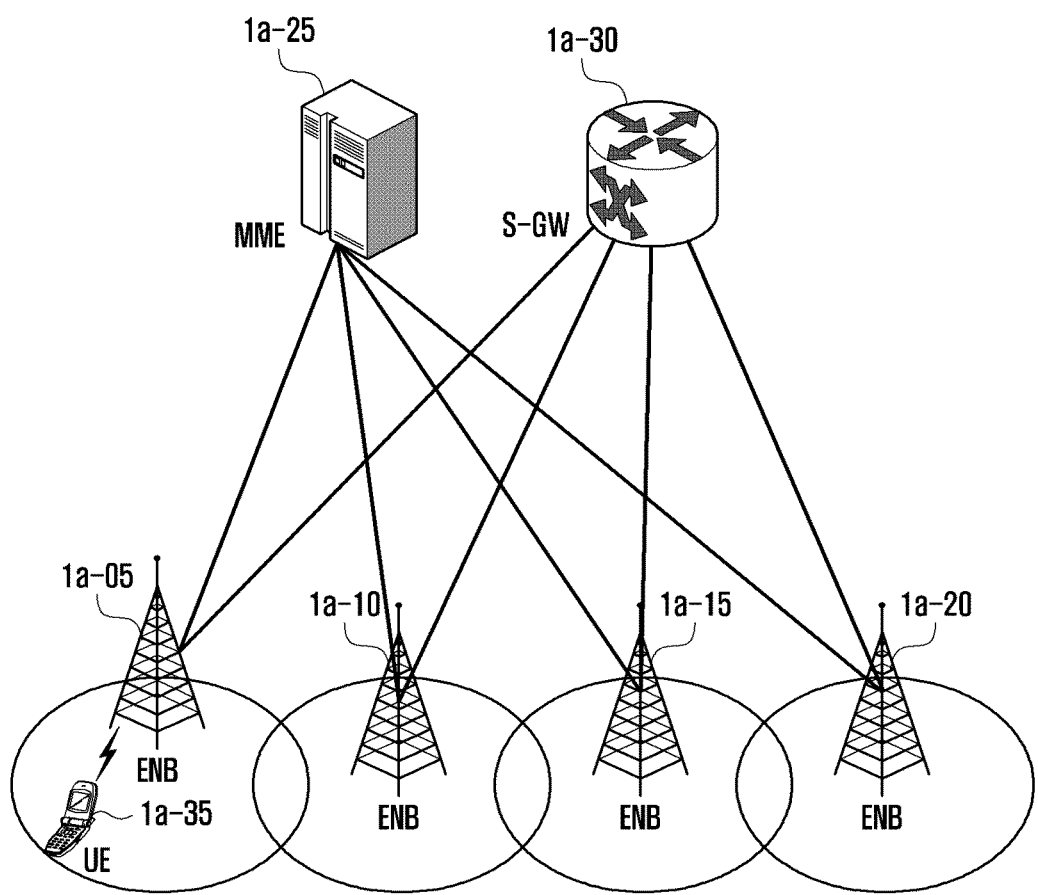
FIG. 1A illustrates a structure of an LTE system that is referred to for description of the present disclosure.

FIGS. 1A through 2G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present invention will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereinafter, for convenience of explanation, in the present disclosure, terms and names defined in a 3rd generation partnership project long term evolution (3GPP LTE) standard which is the latest standard among communication standards that currently exist are used. However, the present disclosure is not limited by the terms and names, and may be identically applied to systems according to different standards. In particular, the present disclosure may be applied to a 3GPP new radio (NR, 5th generation mobile communication standard).

First Embodiment

The first embodiment proposes a method for transmission and reception of data for ultra-reliable and low-latency communications (URLLC) in a wireless communication system.

FIG. 1A illustrates a structure of an LTE system that is referred to for description of the present disclosure.

Referring to FIG. 1A, the wireless communication system is configured of a plurality of base stations 1a-05, 1a-10, 1a-15, and 1a-20, a mobility management entity (MME) 1a-25, and a serving-gateway (S-GW) 1a-30. A user equipment (hereinafter, UE or terminal) 1a-35 accesses an external network through the base stations (evolved Node B (eNB)) 1a-05, 1a-10, 1a-15, and 1a-20 and the S-GW 1a-30.

The base stations 1a-05, 1a-10, 1a-15, and 1a-20 as access nodes of a cellular network provide radio access to terminals accessing the network. That is, the base stations 1a-05, 1a-10, 1a-15, and 1a-20 performs scheduling by collecting state information such as buffer conditions of the terminals, a power headroom state, a channel state, and the like to provide traffic to users, thereby supporting connection between the terminals and a core network (CN).

The MME 1a-25 which is an apparatus performing various control functions in addition to a mobility management function for a terminal is connected to a plurality of base stations, and the S-GW 1a-30 is an apparatus providing a data bearer. Further, the MME 1a-25 and the S-GW 1a-30 may further perform authentication for a terminal accessing the network, bearer management, or the like, and process a packet arrived from the base stations 1a-05, 1a-10, 1a-15, and 1a-20 or a packet to be transferred to the base stations 1a-05, 1a-10, 1a-15, and 1a-20.

Figure 1B:
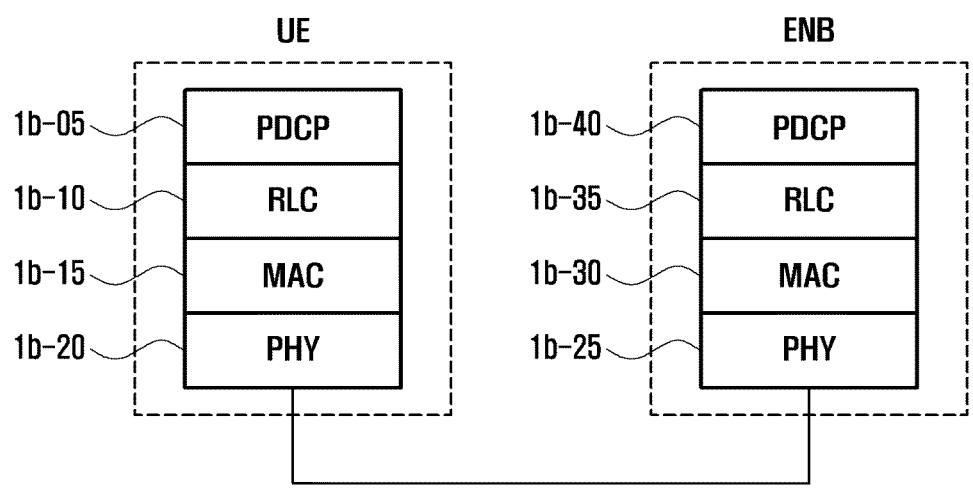
FIG. 1B illustrates a wireless protocol structure of an LTE system that is referred to for description of the present disclosure.

FIG. 1B illustrates a wireless protocol structure of an LTE system that is referred to for description of the present disclosure.

Referring to FIG. 1B, a wireless protocol of the LTE system is configured of a packet data convergence protocol (PDCP) 1b-05 and 1b-40, a radio link control (RLC) 1b-10 and 1b-35, and a medium access control (MAC) 1b-15 and 1b-30 in the terminal and the base station (eNB), respectively.

The PDCP 1b-05 and 1b-40 is responsible for an operation such as IP header compression/decompression, and the like, and the radio link control (hereinafter, referred to as RLC) 1b-10 and 1b-35 reconfigures a PDCP packet data unit (PDU) in an appropriate size.

The MAC 1b-15 and 1b-30 is connected to multiple RLC layer devices configured in one terminal, and performs an operation of multiplexing RLC PDUs into an MAC PDU and demultiplexing RLC PDUs from an MAC PDU.

A physical layer (PHY) 1b-20 and 1b-25 performs an operation of channel-coding and modulating higher layer data and transmitting the higher layer data in a form of an OFDM symbol through a radio channel, or demodulating and channel-decoding an OFDM symbol received through the radio channel and performing channel decoding for transmission to the higher layer.

Further, the physical layer also uses a hybrid automatic repeat request (HARQ) for additional error correction, and a reception end transmits 1 bit information indicating acknowledgement/negative-acknowledgement for reception of a packet transmitted from a transmission end. This is referred to as HARQ ACK/NACK information.

Downlink HARQ ACK/NACK information for uplink transmission is transmitted through a physical hybrid-ARQ indicator channel (PHICH) and uplink HARQ ACK/NACK information for downlink transmission may be transmitted through a physical uplink control channel (PUCCH) or a physical uplink shared channel (PUSCH).

A method for transmitting the HARQ may include asynchronous HARQ and a synchronous HARQ. The asynchronous HARQ is a method in which a timing at which retransmission for failed (re)transmission is performed is not fixed, and the synchronous HARQ is a method in which a timing at which retransmission for failed (re)transmission is performed is fixed (e.g., 8 ms). Further, a plurality of transmission and reception may be simultaneously performed in parallel for uplink and downlink of one terminal, and each transmission is classified by an HARQ process identifier.

Meanwhile, in the asynchronous HARQ, since a retransmission timing is not fixed, the base station provides information on to which HARQ process the present transmission belongs, and information on whether the present transmission is initial transmission or retransmission to the terminal through a physical downlink control channel (PDCCH).

More specifically, the information on to which HARQ process the present transmission belongs is transmitted to the terminal through an HARQ process ID field in the PDCCH, and the information on whether the present transmission is initial transmission or retransmission is transmitted through a new data indicator (NDI) bit in the PDCCH. If a corresponding bit is not changed from an existing value, it means retransmission, and if the corresponding bit is changed to a different value, it means new transmission.

Accordingly, the terminal receives resource allocation information in the PDCCH transmitted by the base station to check details of the corresponding transmission, thereby receiving actual data through a physical downlink shared channel (PDSCH) in a case of downlink, and transmitting actual data through a physical uplink shared channel (PUSCH) in a case of uplink.

Although not illustrated in FIG. 1B, a radio resource control (hereinafter, referred to as RRC) layer exists as a higher layer of the PDCP layers of the terminal and the base station, respectively, and the RRC layer may receive and transmit a configuration control message related to access and measurement for radio resource control.

Figure 1C:
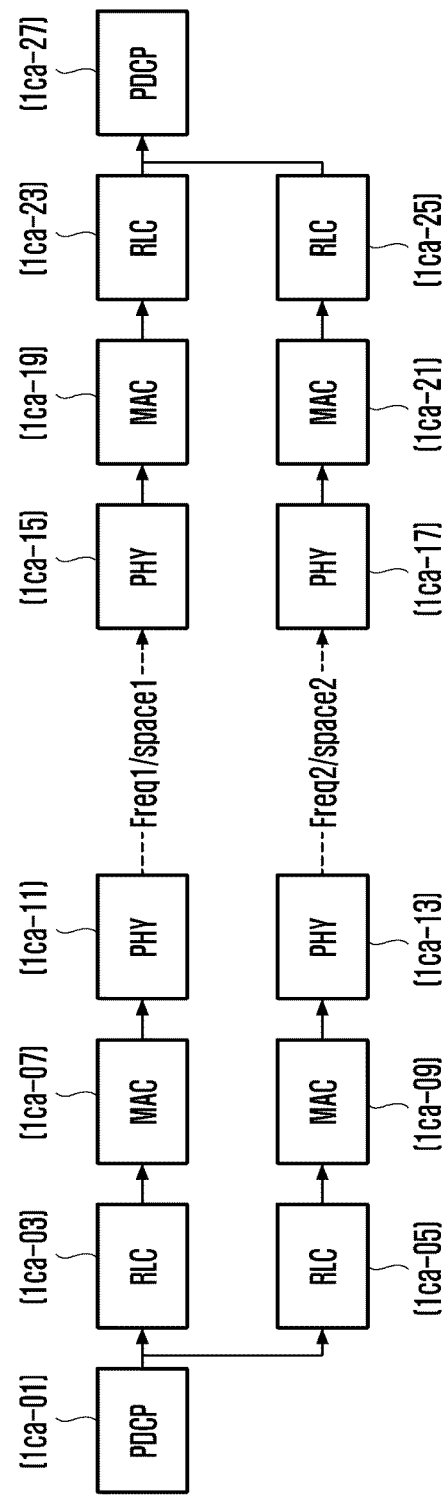
FIGS. 1CA to 1CD illustrate a protocol structure of a transmission end and a reception end for ultra-reliable and low-latency communications (URLLC) for a predetermined traffic type/radio bearer according to an embodiment of the present disclosure.
Figure 1C:
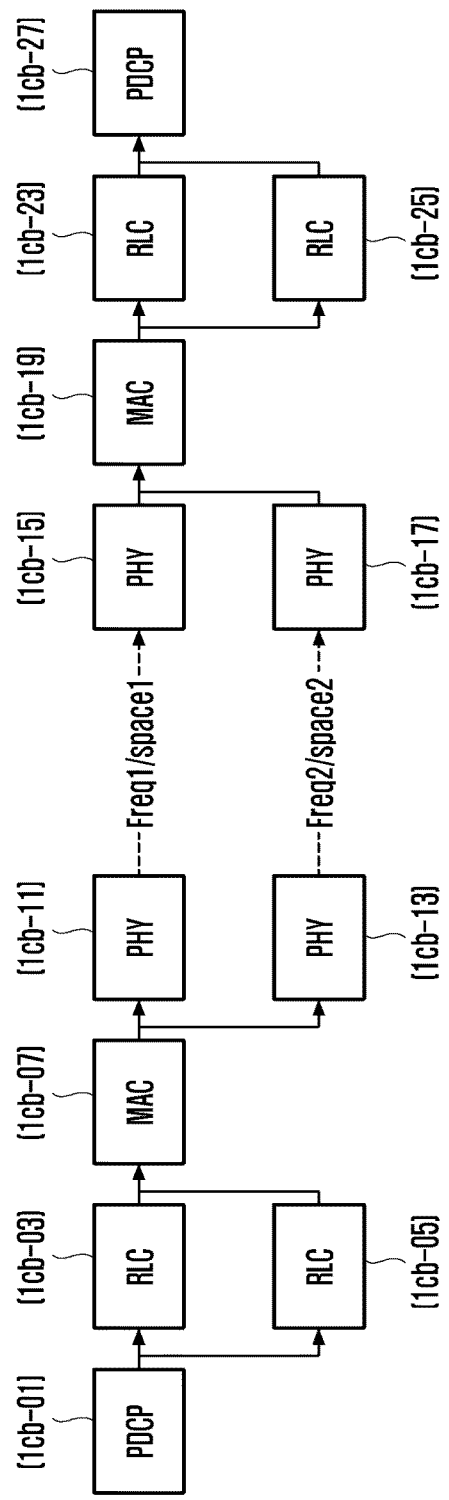
Figure 1C:
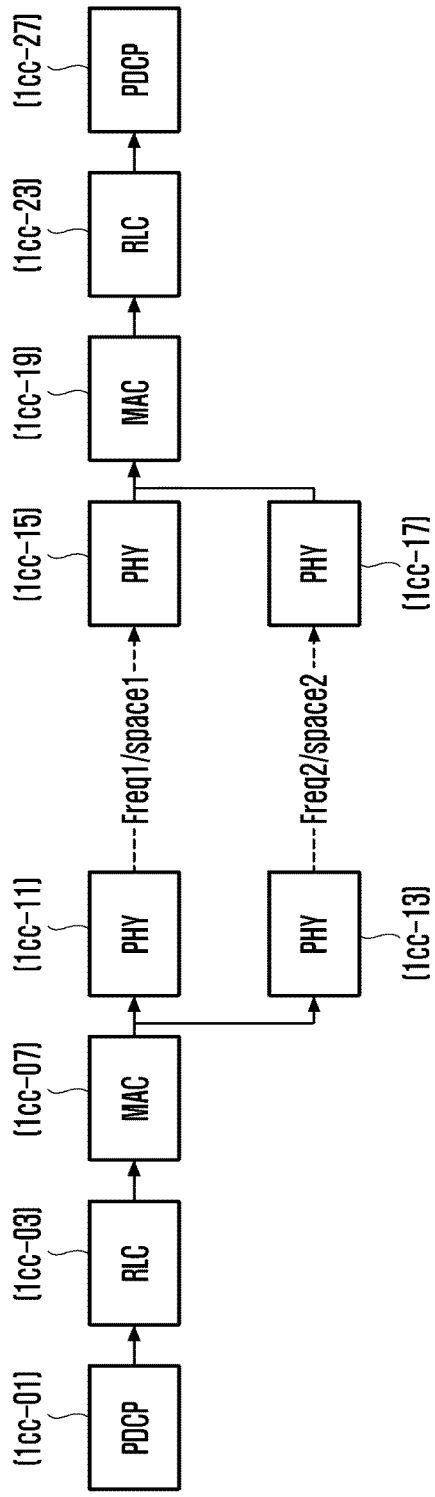
Figure 1C:
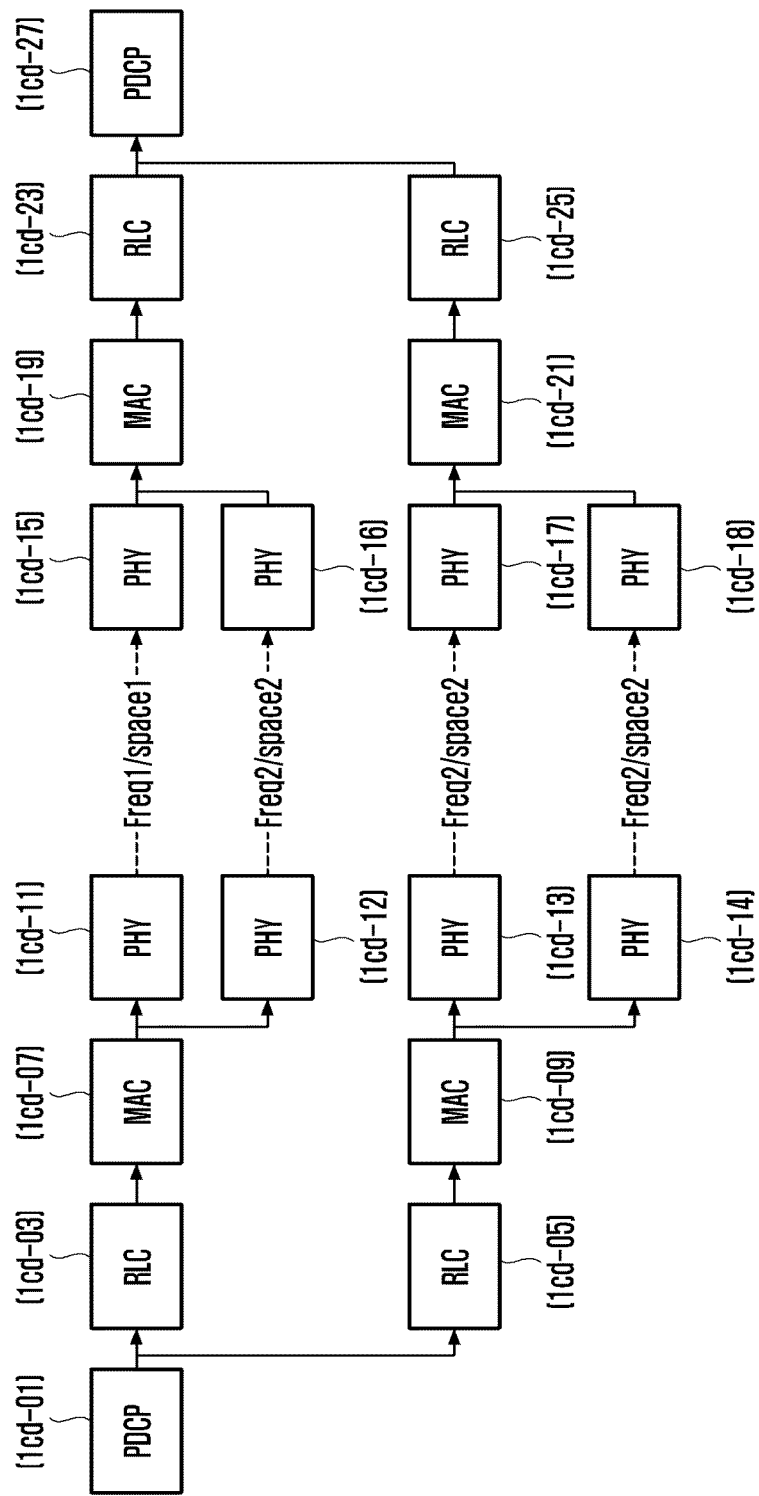
Figure 1D:
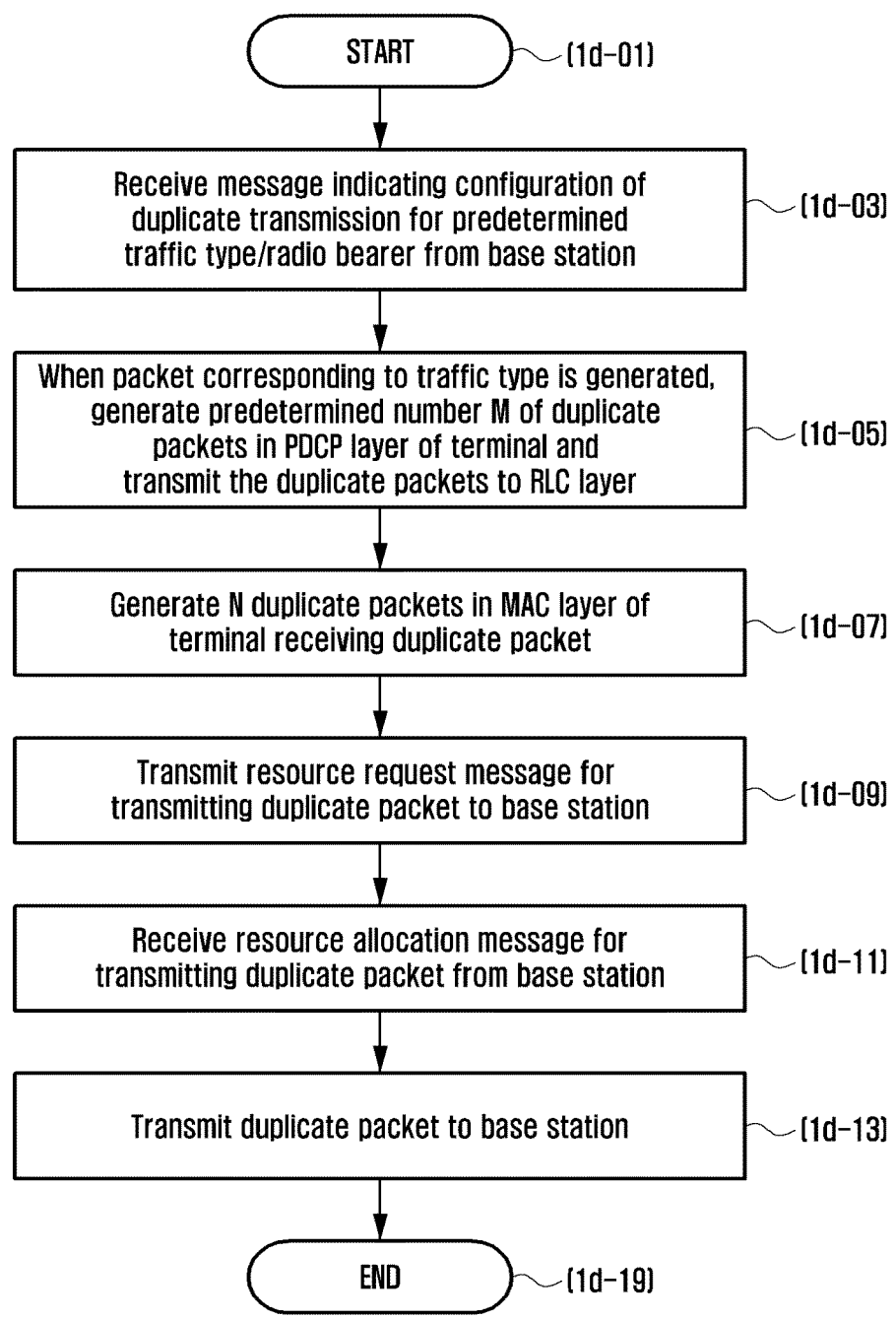
FIG. 1D illustrates an operation of a terminal according to an embodiment of the present disclosure.

FIGS. 1CA to 1CD illustrate a protocol structure of a transmission end and a reception end for ultra-reliable and low-latency communications (URLLC) for a predetermined traffic type/radio bearer according to an embodiment of the present disclosure.

FIG. 1CA illustrates a method of generating a duplicate packet having the same sequence number (SN) in a PDCP layer 1ca-01 for the same packet of a predetermined traffic type/radio bearer and separately transmitting the generated duplicate packet through an independent RLC layer 1ca-03 and 1ca-05, MAC layer 1ca-07 and 1ca-09, and physical layer 1ca-11 and 1ca-13. At this time, the PDCP layer performs transmission through different RLC layers and MAC layers for the same packet.

Each physical layer 1ca-15 and 1ca-17 receiving the packets transmits the packets to MAC layers 1ca-19 and 1ca-21 corresponding thereto, the packets are transmitted to RLCs 1ca-23 and 1ca-25, and finally, the packets are transmitted to a PDCP layer 1ca-27.

If respective packets transmitted through different paths all succeed in transmission and packets having the same SN arrive at the PDCP layer 1ca-27, the duplicate packet is discarded and only one packet is transmitted to a higher layer of the reception side.

The RLC layer may be assumed as an entity operated in an unacknowledged mode (UM) in which retransmission through automatic repeat request (ARQ) for low latency communication is not performed. Further, the different physical layers may be spatially different resources using different frequencies, or using the same frequency and different antennas.

FIG. 1CB illustrates a method of generating a duplicate packet having the same SN in a PDCP layer 1cb-01 for the same packet of a predetermined traffic type/radio bearer and transmitting the generated duplicate packet through an independent RLC layer 1cb-03 and 1cb-05 and a common MAC layer 1cb-07. At this time, the PDCP layer performs transmission through different RLC layers for the same packet to separately manage the SN in the RLC layer.

The MAC layer 1cb-07 transmits the packets received from each RLC layers to the same physical layer or different physical layers 1cb-11 and 1cb-13. Each physical layer 1cb-15 and 1cb-17 receiving the packets transmits the packets to an MAC layer 1ca-19 corresponding thereto, the packets are transmitted to RLCs 1cb-23 and 1cb-25, and finally, the packets are transmitted to a PDCP layer 1cb-27.

If respective packets transmitted through different paths all succeed in transmission and packets having the same SN arrive at the PDCP layer 1cb-27, the duplicate packet is discarded and only one packet is transmitted to a higher layer of the reception side.

Further, the RLC layer may be assumed as an entity operated in an unacknowledged mode (UM) in which retransmission through automatic repeat request (ARQ) for low latency communication is not performed. Further, the different physical layers may be spatially different resources using different frequencies, or using the same frequency and different antennas.

FIG. 1CC illustrates a method in which the same PDCP, RLC layers are used for the same packet of a predetermined traffic type/radio bearer, but a duplicate packet is generated in an MAC layer, and the duplicate packet is transmitted to the same physical layer or different physical layers 1cc-11 and 1cc-13.

Each physical layer 1cc-15 and 1cc-17 receiving the packets transmits the packets to the corresponding MAC layer 1cc-19, RLC layer 1cc-23, and PDCP layer 1cc-27. If the respective packets transmitted through different physical layers all succeed in transmission and the packets having a duplicate RLC SN arrive, the RLC layer 1cc-23 discards the duplicate packet and transmits only one packet to the PDCP layer 1cc-27.

Further, the RLC layer may be assumed as an entity operated in an unacknowledged mode (UM) in which retransmission through automatic repeat request (ARQ) for low latency communication is not performed. Further, the different physical layers may be spatially different resources using different frequencies, or using the same frequency and different antennas.

FIG. 1CD illustrates a method in which FIG. 1CA and FIG. 1CC are combined. That is, a duplicate packet having the same sequence number (SN) in a PDCP layer 1cd-01 for the same packet of a predetermined traffic type/radio bearer is generated and the generated duplicate packet is transmitted through an independent RLC layer 1cd-03 and 1cd-05, and MAC layer 1cd-07 and 1cd-09.

Each MAC layer 1cd-07 and 1cd-09 may generate a duplicate packet and transmit the packets to physical layers 1cd-11, 1cd-12, 1cd-13, and 1cd-14 corresponding to each MAC layer. Each physical layer 1cc-15, 1cc-16, 1cc-17, and 1cc-18 receiving the packets transmits the received packets to the corresponding MAC layers 1cd-19 and 1cd-21, and each MAC layer transmits the packets to corresponding RLC layers 1cd-23 and 1cd-25.

At this time, if all the packets successfully arrive at the RLC layers 1cd-23 and 1cd-25 from the MAC layers 1cd-07 and 1cd-09, the duplicate packet is discarded according to the RLC SN, and only one packet is transmitted to the corresponding PDCP layer 1cd-27, and among the packets received from each RLC layer, if all the packets successfully arrive at the PDCP layer 1cd-01, the duplicate packet is discarded according to the PDCP SN, and only one packet is transmitted to a higher layer.

Further, the RLC layer may be assumed as an entity operated in an unacknowledged mode (UM) in which retransmission through automatic repeat request (ARQ) for low latency communication is not performed. Further, the different physical layers may be spatially different resources using different frequencies, or using the same frequency and different antennas.

In the drawing, it is assumed that the terminal is already connected to the base station and data transmission and reception are possible.

The terminal receives a message indicating configuration of duplicate transmission for a predetermined traffic type/radio bearer from the base station (1d-03). The indicating message may include one of the number M of duplicate packet generation in a PDCP layer and the number N of duplicate packet generation in an MAC layer to be described below.

The M is the same as the number of a reception RLC device connected to a PDCP device configured for the radio bearer, thus the terminal may additionally generate an RLC layer as many as the number M. Further, the N may be a value specified by a resource allocation message or configured by the base station in the configuration message.

Next, when a packet corresponding to the traffic type and the radio bearer is generated in the terminal, if the number M of duplicate packet generation in a PDCP layer in the configuration message is 2 or more, the terminal generates duplicate packets as many as the number, and transmits the duplicate packets to each RLC layer (1d-05). At this time, the PDCP layer of the terminal transmits the respective duplicate packets to different RLC layers. Meanwhile, if the number N of duplicate packet generation in each MAC layer in the configuration message is 2 or more, the MAC layer receiving the packet from the RLC layer generates a duplicate packet for the corresponding packet (1d-07). That is, the total number of duplicate packets is M*N, and a separate N value may also be set in each MAC layer.

The terminal transmits a resource request message to the base station to transmit the generated duplicate packet in uplink (that is, from the terminal to the base station) (1d-09). The resource request message may include at least one of an indicator indicating that a plurality of duplicate packets are included and an identifier indicating that the predetermined traffic type is included.

When receiving a resource allocation message for transmitting the duplicate packet from the base station receiving the resource request message (1d-11), the terminal transmits the duplicate packet to the base station (1d-13). At this time, the resource allocation message may include at least one of information on a plurality of frequencies or space resources described with reference to FIGS. 1CA to 1CD and an indicator indicating that it is allocation related to the ultra-reliable and low-latency traffic type.

By doing so, duplicate transmission of the same data to different frequencies or space resources may be made, thereby improving reliability and decrease latency.

Figure 1E:
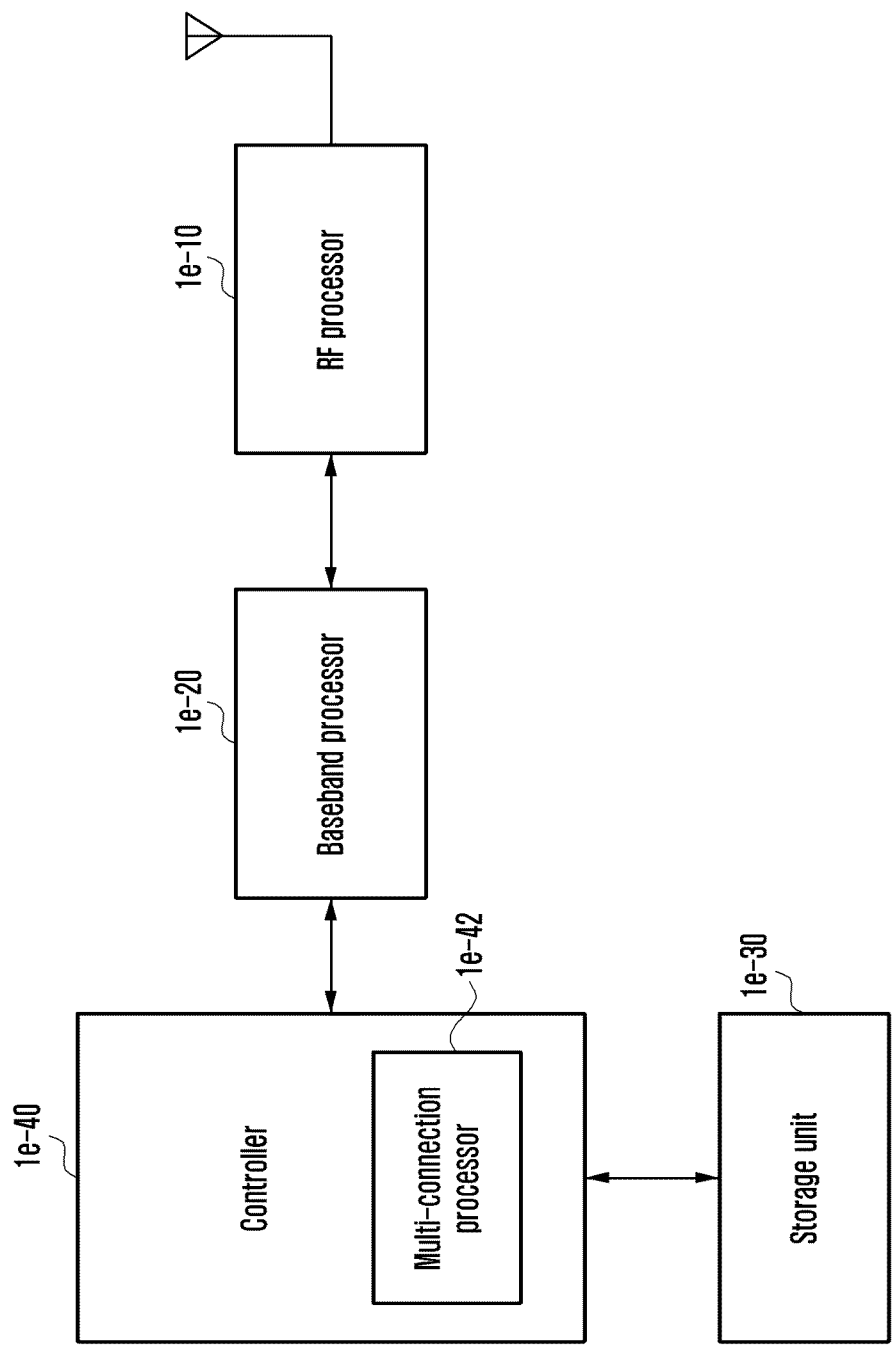
FIG. 1E illustrates a configuration of a terminal according to an embodiment of the present disclosure.

FIG. 1E illustrates a block configuration of a terminal in a wireless communication system according to an embodiment of the present disclosure.

Referring to FIG. 1E, the terminal includes a radio frequency (RF) processor 1e-10, a baseband processor 1e-20, a storage unit 1e-30, and a controller 1e-40.

The RF processor 1e-10 performs a function for transmitting and receiving a signal through a radio channel such as band conversion, amplification, and the like of a signal. That is, the RF processor 1e-10 up-converts a baseband signal provided from the baseband processor 1e-20 into an RF band signal and transmits the up-converted signal through an antenna, and down-converts the PF band signal received through the antenna into the baseband signal.

For example, the RF processor 1e-10 may include a transmission filter, a reception filter, an amplifier, a mixer, an oscillator, a digital to analog converter (DAC), an analog to digital converter (ADC), and the like. In FIG. 1E, only one antenna is illustrated, but the terminal may include a plurality of antennas.

Further, the RF processor 1e-10 may include a plurality of RF chains. Further, the RF processor 1e-10 may perform beamforming. For the beamforming, the RF processor 1e-10 may adjust a phase and size of each of signals transmitted and received through the plurality of antennas or antenna elements.

The baseband processor 1e-20 performs a function of conversion between a baseband signal and a bit string according to a physical layer standard of the system. For example, at the time of data transmission, the baseband processor 1e-20 generates complex symbols by encoding and modulating a transmission bit string. Further, at the time of data reception, the baseband processor 1e-20 restores a reception bit string by demodulating and decoding the baseband signal provided from the RF processor 1e-10.

For example, according to an orthogonal frequency division multiplexing (OFDM) scheme, at the time of data transmission, the baseband processor 1e-20 generates complex symbols by encoding and modulating a transmission bit string, maps the complex symbols, and then configures OFDM symbols through inverse fast Fourier transform (IFFT) operation and cyclic prefix (CP) insertion. Further, at the time of data reception, the baseband processor 1e-20 divides the baseband signal provided from the RF processor 1e-10 into OFDM symbol units, restores signals mapped to subcarriers through fast Fourier transform (FFT) operation, and then restores a reception bit string through demodulation and decoding.

The baseband processor 1e-20 and the RF processor 1e-10 transmit and receive a signal as described above. Accordingly, the baseband processor 1e-20 and the RF processor 1e-10 may be referred to as a transmitter, a receiver, a transceiver, or a communication unit. Further, at least one of the baseband processor 1e-20 and the RF processor 1e-10 may include different communication modules to process signals of different frequency bands. The different frequency bands may include a super high frequency (SHF) band (e.g., 2.5 GHz, 5 GHz), and a millimeter wave (mm wave) band (e.g., 60 GHz).

The storage unit 1e-30 stores data such as a basic program for operation of the terminal, an application program, configuration information, and the like.

The controller 1e-40 controls overall operations of the terminal. For example, the controller 1e-40 transmits and receives a signal through the baseband processor 1e-20 and the RF processor 1e-10. Further, the controller 1e-40 records data in the storage unit 1e-30 and reads the data. To this end, the controller 1e-40 may include at least one processor.

For example, the controller 1e-40 may include a communication processor (CP) performing a control for communication and an application processor (AP) controlling a higher layer such as an application program. According to an embodiment of the present disclosure, the controller 1e-40 includes a multi-connection processor 1e-42 performing processing for operation in a multi-connection mode. For example, the controller 1e-40 may control the terminal to perform the operation of the terminal illustrated in FIG. 1D.

The controller according to an embodiment of the present disclosure generates an RLC layer and an MAC layer for a predetermine bearer according to a configuration received from the base station, and performs duplicate transmission according to the set value at the time of packet transmission of the corresponding bearer.

Figure 1F:
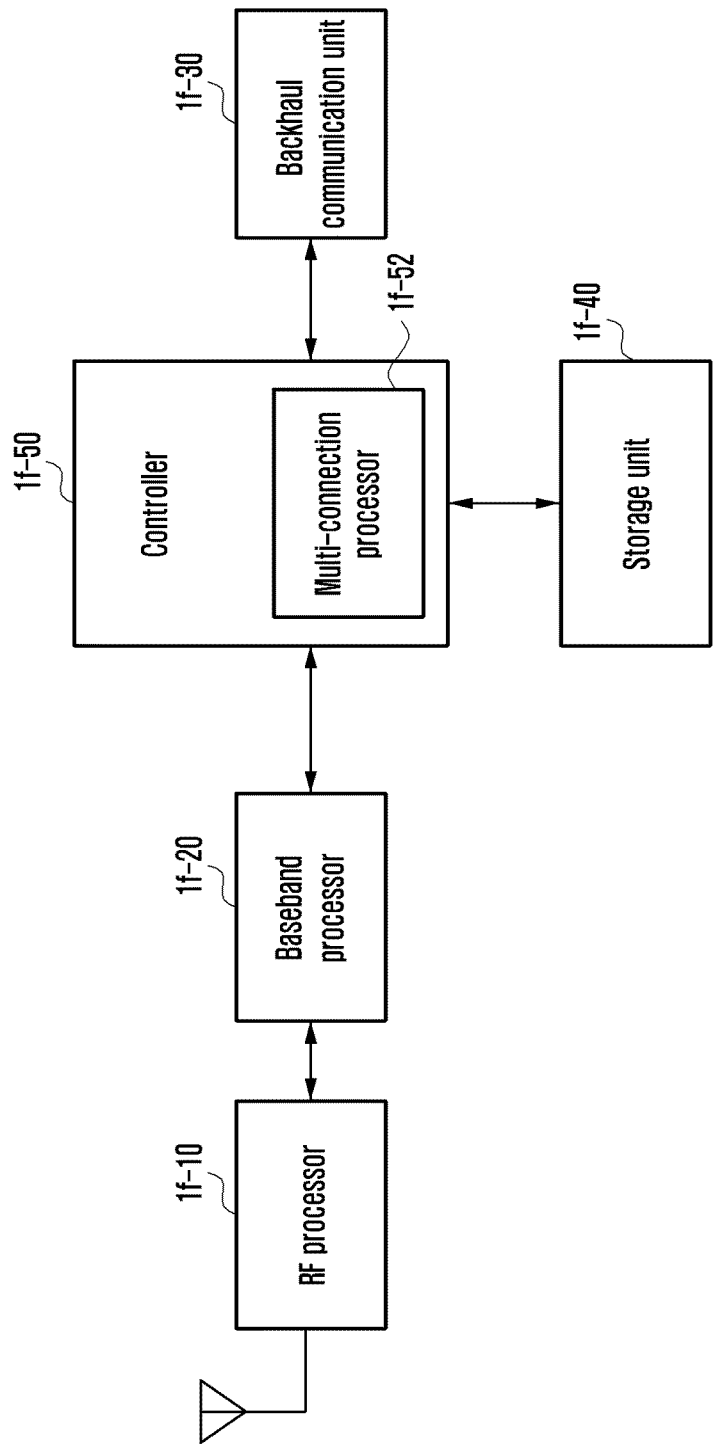
FIG. 1F illustrates a configuration of a base station according to an embodiment of the present disclosure.

FIG. 1F illustrates a block configuration of a base station in a wireless communication system according to an embodiment of the present disclosure.

As illustrated in FIG. 1F, a first access node is configured to include an RF processor 1f-10, a baseband processor 1f-20, a backhaul communication unit 1f-30, a storage unit 1f-40, and a controller 1f-50.

The RF processor 1f-10 performs a function for transmitting and receiving a signal through a radio channel such as band conversion, amplification, and the like of a signal. That is, the RF processor 1f-10 up-converts a baseband signal provided from the baseband processor 1f-20 into an RF band signal and transmits the up-converted signal through an antenna, and down-converts the PF band signal received through the antenna into the baseband signal.

For example, the RF processor 1f-10 may include a transmission filter, a reception filter, an amplifier, a mixer, an oscillator, a DAC, an ADC, and the like. In FIG. 1F, only one antenna is illustrated, but the first access node may include a plurality of antennas. Further, the RF processor 1f-10 may include a plurality of RF chains. Further, the RF processor 1f-10 may perform beamforming. For the beamforming, the RF processor 1f-10 may adjust a phase and size of each of signals transmitted and received through the plurality of antennas or antenna elements.

The baseband processor 1f-20 performs a function of conversion between a baseband signal and a bit string according to a physical layer standard of a first radio access technology. For example, at the time of data transmission, the baseband processor 1f-20 generates complex symbols by encoding and modulating a transmission bit string. Further, at the time of data reception, the baseband processor 1f-20 restores a reception bit string by demodulating and decoding the baseband signal provided from the RF processor 1f-10.

For example, according to the OFDM scheme, at the time of data transmission, the baseband processor 1f-20 generates complex symbols by encoding and modulating a transmission bit string, maps the complex symbols, and then configures OFDM symbols through IFFT operation and CP insertion. Further, at the time of data reception, the baseband processor 1f-20 divides the baseband signal provided from the RF processor 1f-10 into OFDM symbol units, restores signals mapped to subcarriers through FFT operation, and then restores a reception bit string through demodulation and decoding.

The baseband processor 1f-20 and the RF processor 1f-10 transmit and receive a signal as described above. Accordingly, the baseband processor 1f-20 and the RF processor 1f-10 may be referred to as a transmitter, a receiver, a transceiver, a communication unit, or a wireless communication unit.

The backhaul communication unit 1f-30 provides an interface for performing communication with other nodes in the network. That is, the backhaul communication unit 1f-30 converts a bit string transmitted from the first access node to other node, for example, other access node, a core network, or the like, into a physical signal, and converts the physical signal received from the other node into a bit string.

The storage unit 1f-40 stores data such as a basic program for operation of the first access node, an application program, configuration information, and the like. In particular, the storage unit 1f-40 may store information on a bearer allocated to the accessed terminal, a measurement result reported from the accessed terminal, and the like. Further, the storage unit 1f-40 may provide information based on which whether to provide multi-connection to the terminal or stop the multi-connection is determined. Further, the storage unit 1f-40 provides the stored data in response to a request of the controller 1f-50.

The controller 1f-50 controls overall operations of the first access node. For example, the controller 1f-50 transmits and receives a signal through the baseband processor 1e-20 and the RF processor 1e-10, or the backhaul communication unit 1f-30. Further, the controller 1f-50 records data in the storage unit 1f-40 and reads the data. To this end, the controller 1f-50 may include at least one processor.

According to an embodiment of the present disclosure, the controller 1f-50 indicates configurations for data transmission for URLLC to the terminal depending on capabilities of the terminal. Thereafter, when receiving a resource request from the terminal, a plurality of resources are allocated to different frequencies or space resources in response thereto, and a packet is received from the terminal.

The methods according to the embodiments described in claims or specification of the present disclosure may be implemented in a form of hardware, software, or a combination of hardware and software.

In the case of implementation in the form of software, a computer-readable storage medium that stores one or more programs (software module). The one or more programs stored in the computer-readable storage medium are configured for execution by one or more processors in an electronic device. The one or more programs include instructions making the electronic device to execute the method according to the embodiments described in claims or specification of the present disclosure.

The program (software module, software) may be stored in a random access memory, a non-volatile memory including a flash memory, a read only memory (ROM), an electrically erasable programmable read only memory (EEPROM), a magnetic disc storage device), a compact disc-ROM (CD-ROM), a digital versatile disc (DVD) or other types of optical storage device, and a magnetic cassette. Alternatively, the program may be stored in a memory configured by a combination of some or all of those described above. Further, each configuration memory may also be included in plural.

Further, the program may be stored in an attachable storage device that may be accessed through a communication network such as Internet, Intranet, a local area network (LAN), a wide LAN (WLAN), or a storage area network (SAN), or a communication network configured by a combination thereof. Such a storage device may access an apparatus performing the embodiment of the present disclosure through an external port. Further, a separate storage device on a communication network may access the apparatus performing the embodiment of the present disclosure through an external port.

In detailed embodiments of the present disclosure described above, components included in the present disclosure have been expressed in the singular or plural according to the suggested detailed embodiment. However, the expression in the singular or plural is appropriately selected for the situation suggested for convenience of explanation, and the present disclosure is not limited to a single component or a plurality of components. Even the components expressed in the plural may be configured as a single component, or even the component expressed in the singular may be configured as plural components.

While the present disclosure has been described in connection with the detailed embodiments thereof, various modifications can be made without departing from the scope of the present disclosure. Therefore, the scope of the present disclosure should not be construed as being limited to the described embodiments but be defined by the appended claims as well as equivalents thereto.

Second Embodiment

A second embodiment of present disclosure provides a method of using a corresponding resource if a terminal receives uplink resource allocation during random access in a cell in which only a sounding reference signal (SRS) may be transmitted in uplink.

Figure 2A:
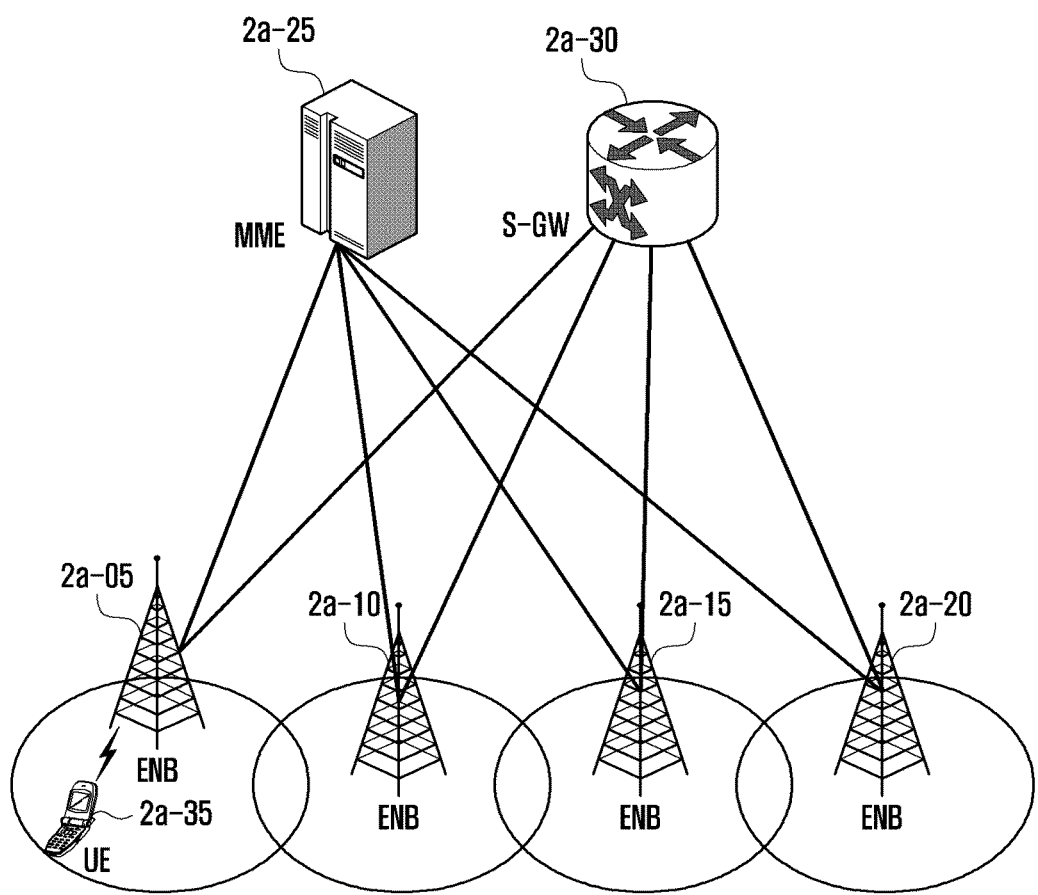
FIG. 2A illustrates an example of a network structure of a wireless communication system according to an embodiment of the present disclosure.

FIG. 2A illustrates a structure of an LTE system to which the present disclosure is applied.

Referring to FIG. 2A, the wireless communication system is configured of a plurality of base stations 2a-05, 2a-10, 2a-15, and 2a-20, a mobility management entity (MME) 2a-25, and a serving-gateway (S-GW) 2a-30. A user equipment (hereinafter, UE or terminal) 2a-35 accesses an external network through the base stations 2a-05, 2a-10, 2a-15, and 2a-20 and the S-GW 2a-30.

The base stations 2a-05, 2a-10, 2a-15, and 2a-20 as access nodes of a cellular network provide radio access to terminals accessing the network. That is, the base stations 2a-05, 2a-10, 2a-15, and 2a-20 performs scheduling by collecting state information such as buffer conditions of the terminals, a power headroom state, a channel state, and the like to provide traffic to users, thereby supporting connection between the terminals and a core network (CN).

The MME 2a-25 which is an apparatus performing various control functions in addition to a mobility management function for a terminal is connected to a plurality of base stations, and the S-GW 2a-30 is an apparatus providing a data bearer.

Further, the MME 2a-25 and the S-GW 2a-30 may further perform authentication for a terminal accessing the network, bearer management, or the like, and process a packet arrived from the base stations 2a-05, 2a-10, 2a-15, and 2a-20 or a packet to be transferred to the base stations 2a-05, 2a-10, 2a-15, and 2a-20.

Figure 2B:
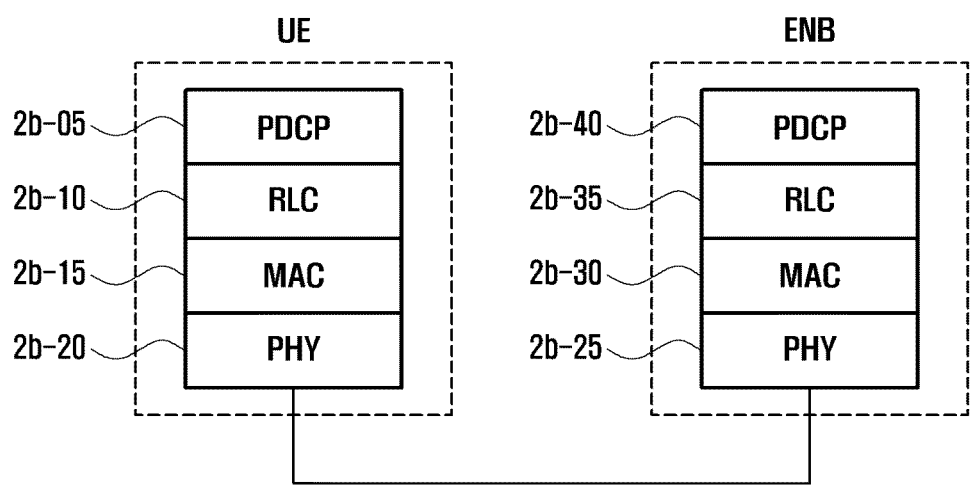
FIG. 2B illustrates a wireless protocol structure of the LTE system to which the present disclosure is applied.

FIG. 2B illustrates a wireless protocol structure of the LTE system to which the present disclosure is applied.

Referring to FIG. 2B, a wireless protocol of the LTE system is configured of a packet data convergence protocol (PDCP) 2b-05 and 2b-40, a radio link control (RLC) 2b-10 and 2b-35, and a medium access control (MAC) 2b-15 and 2b-30 in the terminal and an eNB, respectively. The PDCP 2b-05 and 2b-40 is responsible for an operation such as IP header compression/decompression, and the like, and the radio link control (hereinafter, referred to as RLC) 2b-10 and 2b-35 reconfigures a PDCP packet data unit (PDU) in an appropriate size.

The MAC 2b-15 and 2b-30 is connected to multiple RLC layer devices configured in one terminal, and performs an operation of multiplexing RLC PDUs into an MAC PDU and demultiplexing RLC PDUs from an MAC PDU. A physical layer (PHY) 2b-20 and 2b-25 performs an operation of channel-coding and modulating higher layer data and transmitting the higher layer data in a form of an OFDM symbol through a radio channel, or demodulating an OFDM symbol received through the radio channel and performing channel decoding for transmission to a higher layer.

Further, the physical layer uses a hybrid automatic repeat request (HARQ) for additional error correction, and a reception end transmits 1 bit information indicating acknowledgement/negative-acknowledgement for reception of a packet transmitted from a transmission end. This is referred to as HARQ ACK/NACK information. Downlink HARQ ACK/NACK information for uplink transmission is transmitted through a physical hybrid-ARQ indicator channel (PHICH) and uplink HARQ ACK/NACK information for downlink transmission may be transmitted through a physical uplink control channel (PUCCH) or a physical uplink shared channel (PUSCH).

Although not illustrated in FIG. 2B, a radio resource control (hereinafter, referred to as RRC) layer exists as a higher layer of the PDCP layers of the terminal and the base station, respectively, and the RRC layer may receive and transmit a configuration control message related to access and measurement for radio resource control.

Meanwhile, the PHY layer may be configured of one or a plurality of frequencies/carriers, and a technology of simultaneously setting and using a plurality of frequencies is referred to as carrier aggregation (hereinafter, referred to as CA). In the CA technology, a primary carrier and additional one or multiple subcarriers are used for communication between the terminal (or UE) and the base station (E-UTRAN NodeB, eNB), rather than using only one carrier, thereby remarkably increasing a transmission amount as much as the number of subcarriers. Meanwhile, in the LTE, a cell in the base station using the primary carrier is referred to as a primary cell (PCell), and a cell using the subcarrier is referred to as a secondary cell (SCell).

Figure 2C:
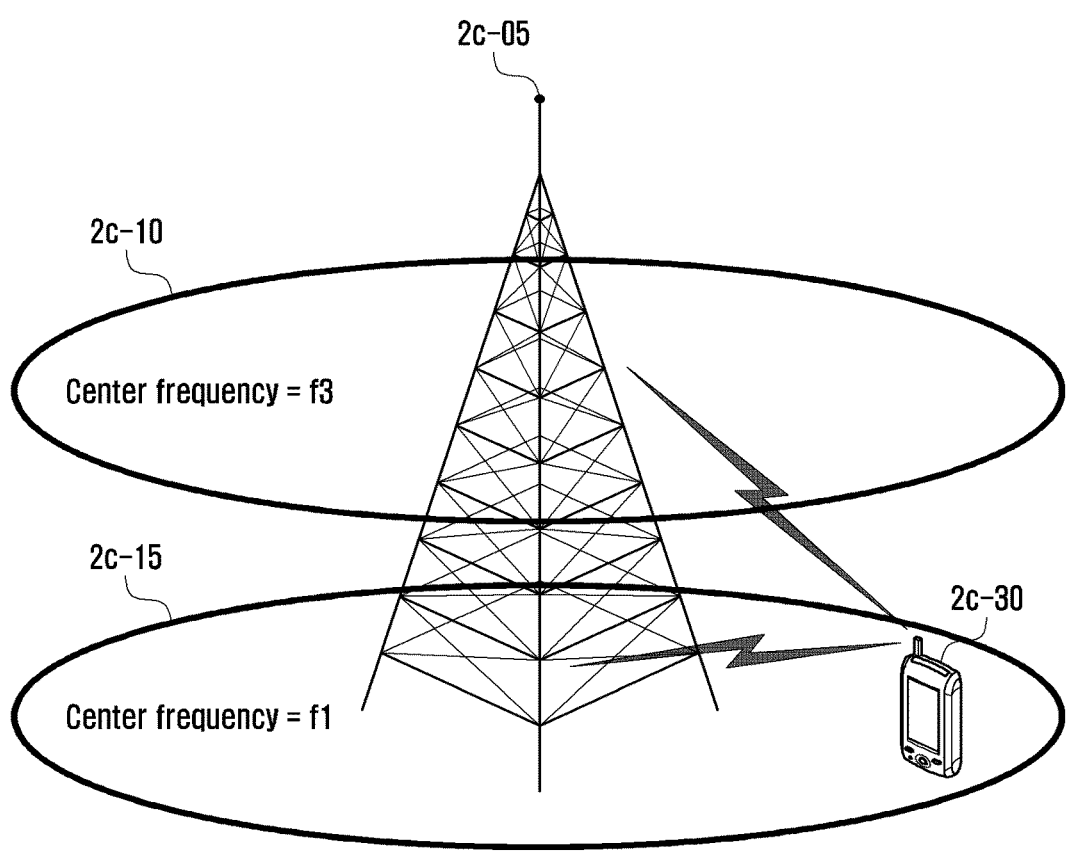
FIG. 2C illustrates carrier aggregation in a terminal.

FIG. 2C illustrates carrier aggregation in a terminal.

Referring to FIG. 2C, one base station generally transmits and receives multiple carriers over multiple frequency bands. For example, when the base station 2c-05 transmits a carrier 2c-15 of which a center frequency is f1 and a carrier 2c-10 of which a center frequency is f3, typically, one terminal transmits and receives data using one of the two carriers. However, the terminal having the CA capability may simultaneously transmit and receive the data from multiple carriers. The base station 2c-05 may increase a transmission rate of the terminal 2c-30 having the CA capability by allocating more carriers depending on a situation.

When one downlink carrier and one uplink carrier that are transmitted from and received by one base station configure one cell, it may also be understood that the CA means that the terminal simultaneously transmits and receives data through multiple cells. Through this, a maximum transmission rate is increased in proportion to the number of aggregated carriers.

Hereinafter, in describing the present disclosure, data reception by the terminal through any downlink carrier or data transmission by the terminal through nay uplink carrier may have the same meaning as that data transmission and reception are performed using a control channel and a data channel provided in a cell corresponding to a center frequency and frequency band characterizing the carrier. Further, hereinafter, the embodiment of the present disclosure will be described by assuming the LTE system for convenience of explanation, but the present disclosure may be applied to various wireless communication systems supporting the CA.

Figure 2D:
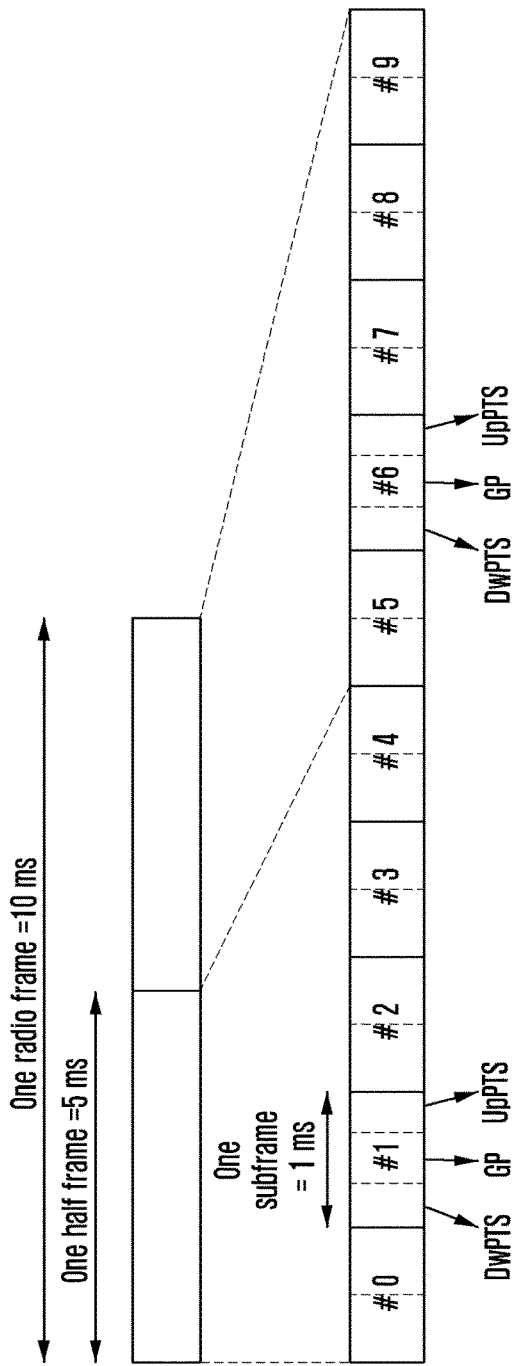
FIG. 2D illustrates a frame structure of an LTE TDD system.

FIG. 2D illustrates a frame structure of a time division duplex (TDD) system having switch point periodicity of 5 ms of the LTE system. That is, it is a frame structure corresponding to configurations 0, 1, 2, or 6 in Table at a lower portion of FIG. 2D. In a frame structure corresponding to configurations 3, 4, or 5, only one special subframe to be described below is at a position of #1 subframe in one frame, and detailed description thereof will be omitted.

As illustrated in FIG. 2D, a length of one frame in the LTE is 10 ms, and this is again divided into 10 subframes having a length of 1 ms (#0, #1, #2, . . . , #9). Here, referring to Table at the lower portion of FIG. 2D, #0, #2, #3, #4, #5, #7, #8, and #9 may be used as a downlink subframe (indicated by "D" in Table) and an uplink subframe (indicated by "U" in Table) according to TDD configuration. That is, in the case of TDD configuration 0, subframes #0 and #5 are used as downlink subframes, and subframes #2, #3, #4, #7, #8, and #9 are used as uplink subframes, and in the case of TDD configuration 1, subframes #0, #4, #5, and #9 are used as downlink subframes, and subframes #2, #3, #7, and #8 are used as uplink subframes.

In FIG. 2D, subframes #1 and #6 are special subframes, which are subframes in a transition period from downlink to uplink. That is, it is a slot divided into three fields of a downlink pilot time slot (DwPTS), a guard period (GP), and an uplink pilot time slot (UpPTS), in which downlink data transmission is possible in the DwPTS field, but uplink data transmission is not possible in the UpPTS field, and transmission of a sounding reference signal (SRS) and the like is possible. The GP is an idle period in conversion between downlink and uplink.

Figure 2E:
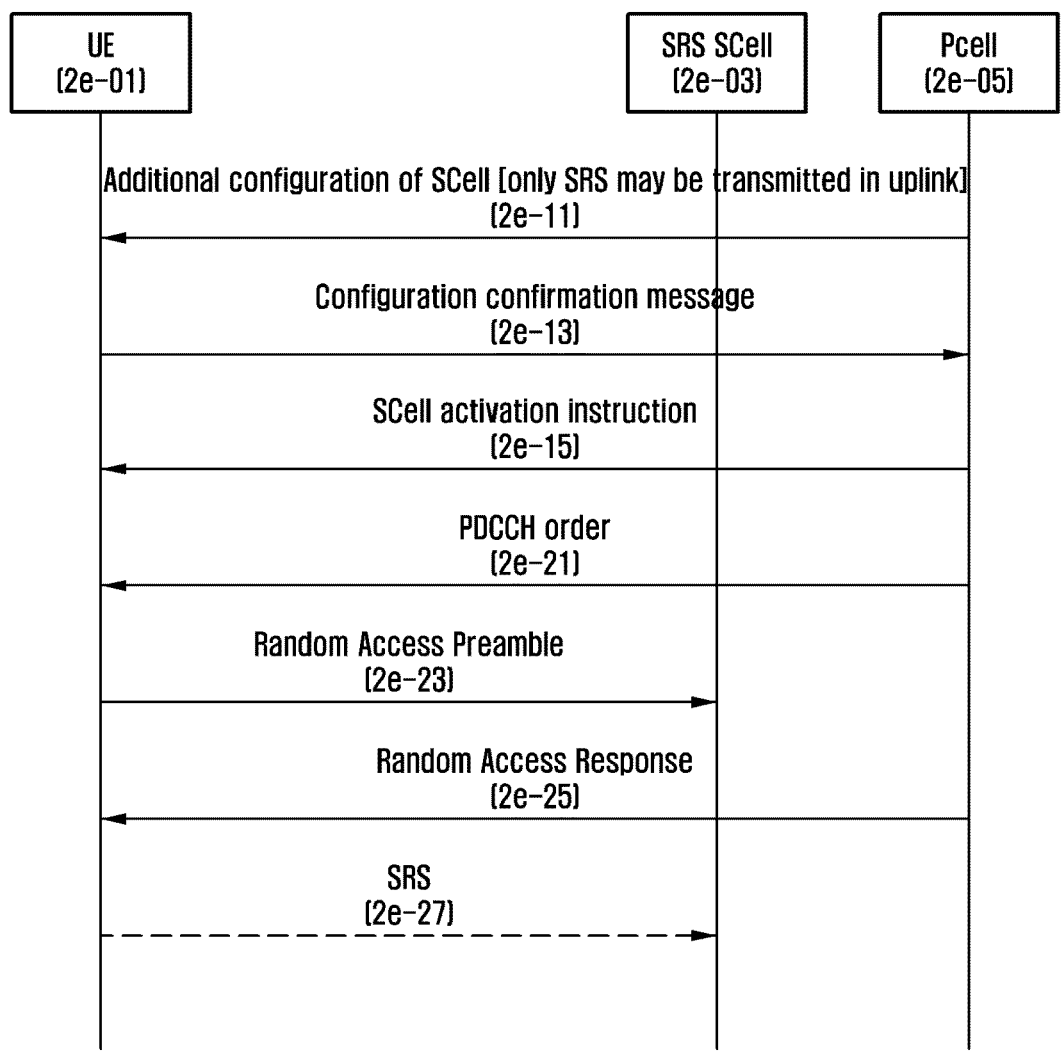
FIG. 2E illustrates message flow of a terminal and a base station according to an embodiment of the present disclosure.

FIG. 2E is a diagram illustrating message flow of a terminal and a base station when applying the present disclosure. In the drawing, it is assumed that the terminal is already connected to the base station and data transmission and reception are possible.

The terminal receives an instruction to additionally configure a TDD cell in which only the SRS may be transmitted in uplink as an SCell from a PCell (or an activated SCell) (2e-11). The reason of adding the cell as described above is that since the terminal may not simultaneously transmit multiple uplink due to limitation in its function, practically, only downlink is received in the added cell, and when the terminal transmits the SRS to the uplink subframe described above in FIG. 2D by temporarily switching/moving to the added cell, the base station receives the transmitted SRS to check an uplink channel state to thereby guess a downlink channel state.

By doing so, the base station may save resources for channel state report of the added cell. The configuration message may be RRCConnectionReconfiguration message of the RRC layer. Further, the configuration message may include one or more of SRS configuration information in the added cell, random access configuration information in the added cell, and the like. The random access configuration information may include information indicating in which resource of which uplink the terminal may perform random access, and the like.

The terminal receiving the configuration message transmits a message indicating that the configuration message is properly received to the base station (2e-13). As the confirmation message, an RRCConnectionReconfigurationComplete message and the like may be used.

Thereafter, the terminal receives an activation message from the base station to actually use the additionally configured cell (2e-15).

Thereafter, the terminal receives instruction to transmit a preamble to the added cell from the base station for obtaining a transmission timing to transmit the SRS to the added cell, or for other reasons (2e-21). The message instructing the preamble transmission may include at least one of a specific preamble identifier and information for limiting specific resources among the configured random access resources.

The terminal transmits a random access preamble signal to the added cell according to the preamble transmission instruction (2e-23). The base station receiving the random access preamble transmits a random access response message through the PCell (2e-25). The response message may include at least one of uplink transmission timing adjustment information, uplink transmission resource information, and SRS transmission-related resource information.

According to the first embodiment of the present disclosure, the terminal receiving the response message does not transmit the data and the SRS through the corresponding resource even though the uplink transmission resource information is present.

According to the second embodiment of the present disclosure, the SRS is transmitted to the subframe to which the uplink transmission resource is allocated in the added cell.

According to a third embodiment of the present disclosure, if the response message includes the SRS transmission-related resource information, the terminal transmits the SRS to the corresponding subframe in the added cell according to the indicated information.

Figure 2F:
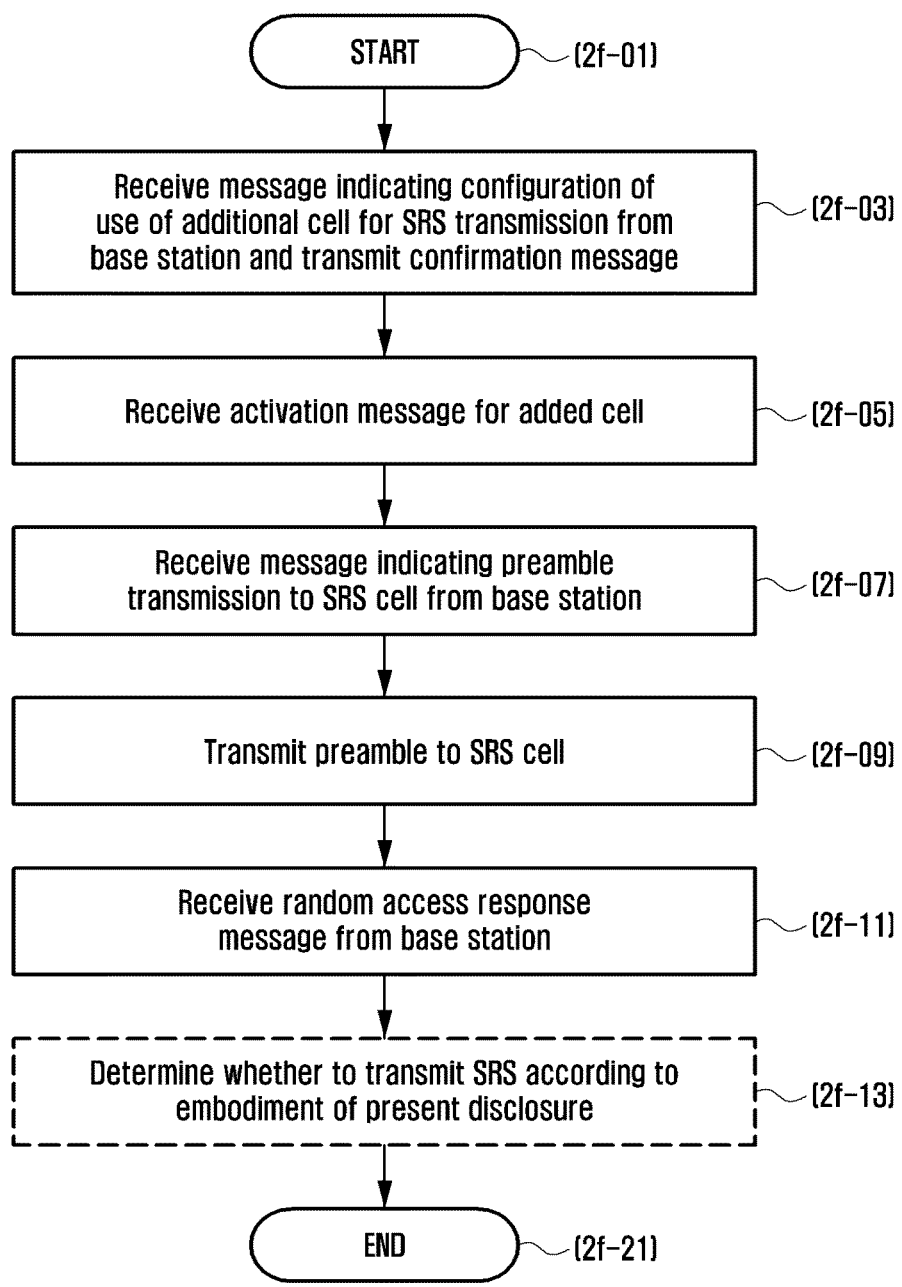
FIG. 2F illustrates an operation of a terminal according to an embodiment of the present disclosure.

FIG. 2F illustrates an operation order of the terminal when applying the present disclosure. In the drawing, it is assumed that the terminal is already connected to the base station and data transmission and reception are possible.

The terminal receives an instruction to additionally configure a TDD cell in which only the SRS may be transmitted in uplink as an SCell from a PCell (or an activated SCell) and transmits a confirmation message therefor (2f-03). The reason of adding the cell as described above is that since the terminal may not simultaneously transmit multiple uplink due to limitation in its function, practically, only downlink is received in the added cell, and when the terminal transmits the SRS to the uplink subframe described above in FIG. 2D by temporarily switching/moving to the added cell, the base station receives the transmitted SRS to check an uplink channel state to thereby guess a downlink channel state.

By doing so, the base station may save resources for channel state report of the added cell. The configuration message may be RRCConnectionReconfiguration message of the RRC layer. Further, the configuration message may include one or more of SRS configuration information in the added cell, random access configuration information in the added cell, and the like. The random access configuration information may include information indicating in which resource of which uplink the terminal may perform random access, and the like. Further, as the confirmation message, an RRCConnectionReconfigurationComplete message and the like may be used.

Thereafter, the terminal receives an activation message from the base station to actually use the additionally configured cell (2f-05). Accordingly, the terminal may receive downlink data from the corresponding SCell.

Thereafter, the terminal receives instruction to transmit a preamble to the added cell from the base station for obtaining a transmission timing to transmit the SRS to the added cell, or for other reasons (2f-07). The message instructing the preamble transmission may include at least one of a specific preamble identifier and information for limiting specific resources among the configured random access resources.

The terminal transmits a random access preamble signal to the added cell according to the preamble transmission instruction (2f-09), and receives a random access response message through the PCell of the base station (2f-11). The response message may include at least one of uplink transmission timing adjustment information, uplink transmission resource information, and SRS transmission-related resource information.

Thereafter, according to the first embodiment of the present disclosure, the terminal receiving the response message does not transmit the data and the SRS through the corresponding resource even though the uplink transmission resource information is present. Alternatively, according to the second embodiment of the present disclosure, the SRS is transmitted to the subframe to which the uplink transmission resource is allocated in the added cell. Alternatively, according to the third embodiment of the present disclosure, if the response message includes the SRS transmission-related resource information, the terminal transmits the SRS to the corresponding subframe in the added cell according to the indicated information (2f-13).

Figure 2G:
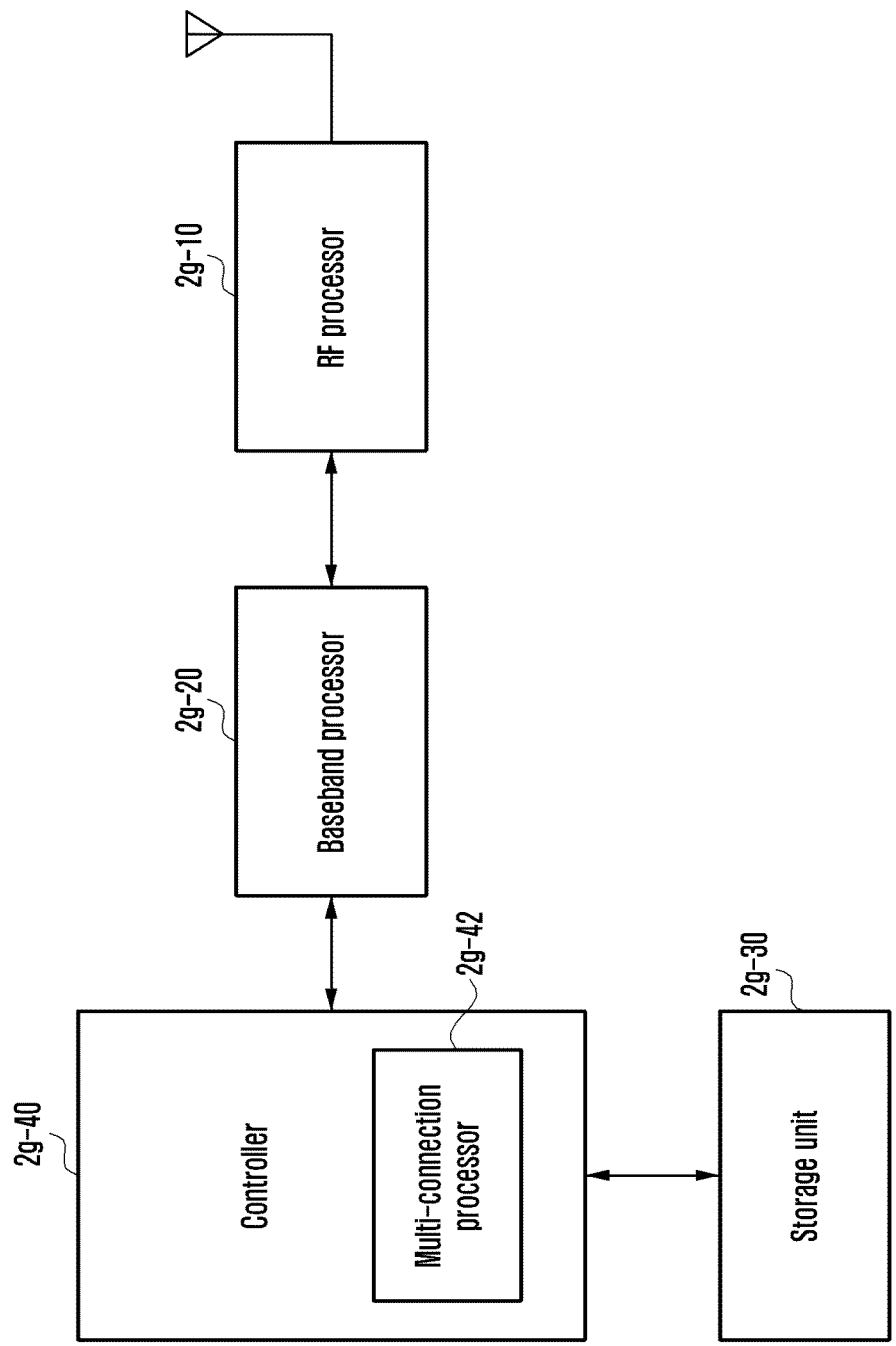
FIG. 2G illustrates a configuration of a terminal in a wireless communication system according to an embodiment of the present disclosure.

FIG. 2G illustrates a block configuration of a terminal in a wireless communication system according to an embodiment of the present disclosure.

Referring to FIG. 2G, the terminal includes a radio frequency (RF) processor 2g-10, a baseband processor 2g-20, a storage unit 2g-30, and a controller 2g-40.

The RF processor 2g-10 performs a function for transmitting and receiving a signal through a radio channel such as band conversion, amplification, and the like of a signal. That is, the RF processor 2g-10 up-converts a baseband signal provided from the baseband processor 2g-20 into an RF band signal and transmits the up-converted signal through an antenna, and down-converts the PF band signal received through the antenna into the baseband signal.

For example, the RF processor 2g-10 may include a transmission filter, a reception filter, an amplifier, a mixer, an oscillator, a digital to analog converter (DAC), an analog to digital converter (ADC), and the like. In FIG. 2G, only one antenna is illustrated, but the terminal may include a plurality of antennas. Further, the RF processor 2g-10 may include a plurality of RF chains. Further, the RF processor 2g-10 may perform beamforming. For the beamforming, the RF processor 2g-10 may adjust a phase and size of each of signals transmitted and received through the plurality of antennas or antenna elements.

The baseband processor 2g-20 performs a function of conversion between a baseband signal and a bit string according to a physical layer standard of the system. For example, at the time of data transmission, the baseband processor 2g-20 generates complex symbols by encoding and modulating a transmission bit string. Further, at the time of data reception, the baseband processor 2g-20 restores a reception bit string by demodulating and decoding the baseband signal provided from the RF processor 2g-10.

For example, according to an orthogonal frequency division multiplexing (OFDM) scheme, at the time of data transmission, the baseband processor 2g-20 generates complex symbols by encoding and modulating a transmission bit string, maps the complex symbols, and then configures OFDM symbols through inverse fast Fourier transform (IFFT) operation and cyclic prefix (CP) insertion. Further, at the time of data reception, the baseband processor 2g-20 divides the baseband signal provided from the RF processor 2g-10 into OFDM symbol units, restores signals mapped to subcarriers through FFT operation, and then restores a reception bit string through demodulation and decoding.

The baseband processor 2g-20 and the RF processor 2g-10 transmit and receive a signal as described above. Accordingly, the baseband processor 2g-20 and the RF processor 2g-10 may be referred to as a transmitter, a receiver, a transceiver, or a communication unit. Further, at least one of the baseband processor 2g-20 and the RF processor 2g-10 may include a plurality of communication modules to support a plurality of different radio access technologies.

Further, at least one of the baseband processor 2g-20 and the RF processor 2g-10 may include different communication modules to process signals of different frequency bands. For example the different radio access technologies may include a wireless LAN (e.g., IEEE 802.11), a cellular network (e.g., LTE), and the like. Further, the different frequency bands may include a super high frequency (SHF) band (e.g., 2.5 GHz, 5 GHz), and a millimeter wave (mm wave) band (e.g., 60 GHz).

The storage unit eg-30 stores data such as a basic program for operation of the terminal, an application program, configuration information, and the like. In particular, the storage unit 2g-30 may store information on a wireless LAN node performing wireless communication using a wireless LAN access technology. Further, the storage unit 2g-30 provides the stored data in response to a request of the controller 2g-40.

The controller 2g-40 controls overall operations of the terminal. For example, the controller 2g-40 transmits and receives a signal through the baseband processor 2g-20 and the RF processor 2g-10. Further, the controller 2g-40 records data in the storage unit 2g-30 and reads the data. To this end, the controller 2g-40 may include at least one processor. For example, the controller 2g-40 may include a communication processor (CP) performing a control for communication and an application processor (AP) controlling a higher layer such as an application program. According to an embodiment of the present disclosure, the controller 2g-40 includes a multi-connection processor 2g-42 performing processing for operation in a multi-connection mode. For example, the controller 2g-40 may control the terminal to perform the operation of the terminal illustrated in FIG. 2E.

When a TDD cell in which only the SRS may be transmitted in uplink is added and a random access instruction is received from the base station, the controller 2g-40 according to the embodiment of the present disclosure transmits a preamble according thereto, and uses resources included in a random access response message according to the embodiment described above.

The methods according to the embodiments described in claims or specification of the present disclosure may be implemented in a form of hardware, software, or a combination of hardware and software.

In the case of implementation in the form of software, a computer-readable storage medium that stores one or more programs (software module). The one or more programs stored in the computer-readable storage medium are configured for execution by one or more processors in an electronic device. The one or more programs include instructions making the electronic device to execute the method according to the embodiments described in claims or specification of the present disclosure.

The program (software module, software) may be stored in a random access memory, a non-volatile memory including a flash memory, a read only memory (ROM), an electrically erasable programmable read only memory (EEPROM), a magnetic disc storage device), a compact disc-ROM (CD-ROM), a digital versatile disc (DVD) or other types of optical storage device, and a magnetic cassette. Alternatively, the program may be stored in a memory configured by a combination of some or all of those described above. Further, each configuration memory may also be included in plural.

Further, the program may be stored in an attachable storage device that may be accessed through a communication network such as Internet, Intranet, a local area network (LAN), a wide LAN (WLAN), or a storage area network (SAN), or a communication network configured by a combination thereof. Such a storage device may access an apparatus performing the embodiment of the present disclosure through an external port. Further, a separate storage device on a communication network may access the apparatus performing the embodiment of the present disclosure through an external port.

In detailed embodiments of the present disclosure described above, components included in the present disclosure have been expressed in the singular or plural according to the suggested detailed embodiment. However, the expression in the singular or plural is appropriately selected for the situation suggested for convenience of explanation, and the present disclosure is not limited to a single component or a plurality of components. Even the components expressed in the plural may be configured as a single component, or even the component expressed in the singular may be configured as plural components.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a radio resource control (RRC) message including configuration information for configuring at least one secondary cell (SCell);
transmitting, to the base station, a random access preamble to perform a random access procedure for a first SCell among the at least one SCell;
receiving, from the base station, a random access response for the random access preamble, the random access response including information for timing adjustment and an uplink grant; and
applying the information for timing adjustment for the first SCell based on the random access response,
wherein, in case that a physical uplink shared channel (PUSCH) transmission is not configured for the first SCell, the uplink grant included in the random access response is ignored.

2. The method of claim 1, wherein the configuration information includes information on a sounding reference signal (SRS) configuration for the first SCell.

3. The method of claim 2, further comprising:
performing an SRS transmission on the first SCell based on the SRS configuration.

4. The method of claim 3,
wherein the terminal is switched to the first SCell for performing the SRS transmission, from a second SCell which is configured for the PUSCH transmission, and
wherein the second SCell is included in the at least one SCell.

5. The method of claim 4, wherein the PUSCH transmission on the second SCell is interrupted during the SRS transmission.

6. A method performed by a base station in a wireless communication system, the method comprising:
transmitting, to a terminal, a radio resource control (RRC) message including configuration information for configuring at least one secondary cell (SCell);
receiving, from the terminal, a random access preamble to perform a random access procedure for a first SCell among the at least one SCell;
transmitting, to the terminal, a random access response for the random access preamble, the random access response including information for timing adjustment and an uplink grant; and
applying the information for timing adjustment for the first SCell based on the random access response,
wherein, in case that a physical uplink shared channel (PUSCH) transmission is not configured for the first SCell, the uplink grant included in the random access response is ignored by the terminal.

7. The method of claim 6, wherein the configuration information includes information on a sounding reference signal (SRS) configuration for the first SCell.

8. The method of claim 7, further comprising:
receiving, from the terminal, an SRS on the first SCell based on the SRS configuration.

9. The method of claim 8,
wherein the PUSCH transmission is configured for a second SCell among the at least one SCell, and
wherein the PUSCH transmission on the second SCell is interrupted during an SRS transmission on the first SCell.

10. A terminal in a wireless communication system, the terminal comprising:
a transceiver; and
a controller configured to:
receive, via the transceiver from a base station, a radio resource control (RRC) message including configuration information for configuring at least one secondary cell (SCell);
transmit, via the transceiver to the base station, a random access preamble to perform a random access procedure for a first SCell among the at least one SCell;

receive, via the transceiver from the base station, a random access response for the random access preamble, the random access response including information for timing adjustment and an uplink grant; and apply the information for timing adjustment for the first SCell based on the random access response, wherein, in case that a physical uplink shared channel (PUSCH) transmission is not configured for the first SCell, the uplink grant included in the random access response is ignored.

11. The terminal of claim 10, wherein the configuration information includes information on a sounding reference signal (SRS) configuration for the first SCell.

12. The terminal of claim 11, wherein the controller is further configured to perform an SRS transmission on the first SCell based on the SRS configuration.

13. The terminal of claim 12, wherein the terminal is switched to the first SCell for performing the SRS transmission, from a second SCell which is configured for the PUSCH transmission, and wherein the second SCell is included in the at least one SCell.

14. The terminal of claim 13, wherein the PUSCH transmission on the second SCell is interrupted during the SRS transmission.

15. A base station in a wireless communication system, the base station comprising:

a transceiver; and a controller configured to:

transmit, via the transceiver to a terminal, a radio resource control (RRC) message including configuration information for configuring at least one secondary cell (SCell);

receive, via the transceiver from the terminal, a random access preamble to perform a random access procedure for a first SCell among the at least one SCell;

transmit, via the transceiver to the terminal, a random access response for the random access preamble, the random access response including information for timing adjustment and an uplink grant; and apply the information for timing adjustment for the first SCell based on the random access response, wherein, in case that a physical uplink shared channel (PUSCH) transmission is not configured for the first SCell, the uplink grant in the random access response is ignored by the terminal.

16. The base station of claim 15, wherein the configuration information includes information on a sounding reference signal (SRS) configuration for the first SCell.

17. The base station of claim 16, wherein the controller is further configured to receive, via the transceiver from the terminal, an SRS on the first SCell based on the SRS configuration.

18. The base station of claim 17, wherein the PUSCH transmission is configured for a second SCell among the at least one SCell, and wherein the PUSCH transmission on the second SCell is interrupted during an SRS transmission on the first SCell.

* * * * *